(12) United States Patent
Blum et al.

(10) Patent No.: US 11,514,017 B2
(45) Date of Patent: Nov. 29, 2022

(54) SYSTEMS AND METHODS FOR PROVISIONING A NEW SECONDARY IDENTITYIQ INSTANCE TO AN EXISTING IDENTITYIQ INSTANCE

(71) Applicant: JPMORGAN CHASE BANK, N.A., New York, NY (US)

(72) Inventors: Isaac Leonardo Blum, Armonk, NY (US); Brian Dillon, Morganville, NJ (US); Corey Lansford, Lewis Center, OH (US); Carl Dashfield, Columbus, OH (US); Richard Seidenstein, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 178 days.

(21) Appl. No.: 16/983,907

(22) Filed: Aug. 3, 2020

(65) Prior Publication Data
US 2021/0034599 A1 Feb. 4, 2021

Related U.S. Application Data

(60) Provisional application No. 62/882,341, filed on Aug. 2, 2019.

(51) Int. Cl.
*G06F 16/00* (2019.01)
*G06F 16/23* (2019.01)
(Continued)

(52) U.S. Cl.
CPC .......... *G06F 16/2343* (2019.01); *G06F 9/485* (2013.01); *G06F 16/24556* (2019.01)

(58) Field of Classification Search
CPC ........ G06F 16/2343; G06F 8/65; G06F 9/485; G06F 16/24556; G06F 2009/45562;
(Continued)

(56) References Cited

U.S. PATENT DOCUMENTS 9,350,682 B1 5/2016 Gupta et al.
10,382,408 B1 * 8/2019 Ahmed ................ G06F 21/606
(Continued)

OTHER PUBLICATIONS

International Search Report, dated Sep. 25, 2020, from corresponding International Application No. PCT/US2020/044791.
(Continued)

*Primary Examiner* — Syed H Hasan
(74) *Attorney, Agent, or Firm* — Greenberg Traurig LLP

(57) ABSTRACT

Systems and methods for provisioning a new secondary IdentityIQ instance to an existing IdentityIQ instance are disclosed. In one embodiment, a method may include: receiving a request to provision the new secondary IdentityIQ instance; creating a primary IdentityIQ instance for the existing IdentityIQ instance and the new secondary IdentityIQ instance; aggregating data from the existing IdentityIQ instance to the primary IdentityIQ instance; deploying an event handler to the primary IdentityIQ instance to handle incoming requests for the existing IdentityIQ instance; changing a reconciliation process and an audit process from the existing IdentityIQ instance to the primary IdentityIQ instance thereby changing the existing IdentityIQ instance to the secondary IdentityIQ instance for the primary IdentityIQ instance; deploying the new secondary IdentityIQ instance to the primary IdentityIQ instance; and deploying at least one application to the new secondary IdentityIQ instance based on an operation processed by the new secondary IdentityIQ instance.

18 Claims, 2 Drawing Sheets

(51) Int. Cl.
*G06F 16/2455* (2019.01)
*G06F 9/48* (2006.01)
(58) Field of Classification Search
CPC .................. G06F 8/60; G06F 9/45558; G06F 2221/2141; G06F 2221/2145; G06F 21/604; H04L 67/34; H04L 67/10
See application file for complete search history.

(56) References Cited

U.S. PATENT DOCUMENTS

| | | |
|---|---|---|
| 10,228,969 B1 | 12/2019 | Gupta et al. |
| 2006/0225032 A1* | 10/2006 | Klerk ........................ G06F 8/10 717/105 |
| 2016/0089606 A1* | 3/2016 | Javed Lal Mohammed Ameerjan ............... A63F 13/30 463/29 |
| 2019/0065231 A1 | 2/2019 | Schmisseur et al. |

OTHER PUBLICATIONS

Written Opinion of the International Searching Authority, dated Sep. 25, 2020, from corresponding International Application No. PCT/US2020/044791.

* cited by examiner

SYSTEMS AND METHODS FOR PROVISIONING A NEW SECONDARY IDENTITYIQ INSTANCE TO AN EXISTING IDENTITYIQ INSTANCE

RELATED APPLICATIONS

This application claims priority to, and the benefit of, U.S. Provisional Patent Application Ser. No. 62/882,341 filed Aug. 2, 2019, the disclosure of which is hereby incorporated, by reference, in its entirety.

BACKGROUND OF THE INVENTION

1. Field of the Invention

The present disclosure generally relates to systems and methods for provisioning a new secondary IdentityIQ instance to an existing IdentityIQ instance.

2. Description of the Related Art

SailPoint's IdentityIQ® software is an identity and access management solution for enterprise customers that delivers a wide variety of Identity and Access Management (IAM) processes, including automated access certifications, policy management, access request and provisioning, password management, and identity intelligence. The IdentityIQ® software has a flexible connectivity model that simplifies the management of applications running in the datacenter or the cloud.

SUMMARY OF THE INVENTION

Systems and methods for provisioning a new secondary IdentityIQ instance to an existing IdentityIQ instance are disclosed. In one embodiment, a method for provisioning an existing IdentityIQ instance with a new secondary IdentityIQ instance may include: (1) receiving a request to provision the new secondary IdentityIQ instance; (2) creating a primary IdentityIQ instance for the existing IdentityIQ instance and the new secondary IdentityIQ instance; (3) aggregating data from the existing IdentityIQ instance to the primary IdentityIQ instance; (4) deploying an event handler to the primary IdentityIQ instance to handle incoming requests for the existing IdentityIQ instance; (5) changing a reconciliation process and an audit process from the existing IdentityIQ instance to the primary IdentityIQ instance thereby changing the existing IdentityIQ instance to the secondary IdentityIQ instance for the primary IdentityIQ instance; (6) deploying the new secondary IdentityIQ instance to the primary IdentityIQ instance; and (7) deploying at least one application to the new secondary IdentityIQ instance based on an operation processed by the new secondary IdentityIQ instance.

In one embodiment, request to provision the new secondary IdentityIQ instance may be received by the existing IdentityIQ instance.

In one embodiment, the request to provision the new secondary IdentityIQ instance may include an identification of a target endpoint type for the new secondary IdentityIQ instance.

In one embodiment, the target endpoint type may include one of a mainframe, infrastructure as a service, a human, and a non-human.

In one embodiment, the method may further include verifying that hardware to support the new secondary IdentityIQ instance is available.

In one embodiment, data aggregated from the existing IdentityIQ instance may include data from the existing IdentityIQ instance's IdentityIQ database.

In one embodiment, the request handler may process requests with an access catalog.

In one embodiment, the step of deploying the new secondary IdentityIQ instance may include updating logic the primary IdentityIQ instance is updated to recognize the target endpoints for the new secondary IdentityIQ instance.

In one embodiment, the at least one application that is deployed to the second IdentityIQ instance may be associated with the target endpoint type for the new secondary IdentityIQ instance.

According to another embodiment, a system for provisioning an existing instance with a new secondary instance may include: an existing IdentityIQ instance; a primary IdentityIQ instance; and a new secondary IdentityIQ instance. The primary IdentityIQ instance may aggregate data from the existing IdentityIQ instance, the primary IdentityIQ instance's event handler may be updated to handle incoming requests for the existing IdentityIQ instance; the primary IdentityIQ instances' reconciliation process and audit process may be changed from the existing IdentityIQ instance to the primary IdentityIQ instance; and at least one application is deployed to the new secondary IdentityIQ instance based on an operation processed by the new secondary IdentityIQ instance.

In one embodiment, the request to provision the new secondary IdentityIQ instance may be received by the existing IdentityIQ instance.

In one embodiment, the request to provision the new secondary IdentityIQ instance may include an identification of a target endpoint type for the new secondary IdentityIQ instance.

In one embodiment, the target endpoint type may be one of a mainframe, infrastructure as a service, a human, and a non-human.

In one embodiment, the system may further include a host program or application that may verify that hardware to support the new secondary IdentityIQ instance is available.

In one embodiment, the data aggregated from the existing IdentityIQ instance may include data from the existing IdentityIQ instance's IdentityIQ database.

In one embodiment, the request handler may process requests with an access catalog.

In one embodiment, logic in the primary IdentityIQ instance may be updated to recognize the target endpoints for the new secondary IdentityIQ instance.

In one embodiment, the at least one application that is deployed to the second IdentityIQ instance may be associated with the target endpoint type for the new secondary IdentityIQ instance.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
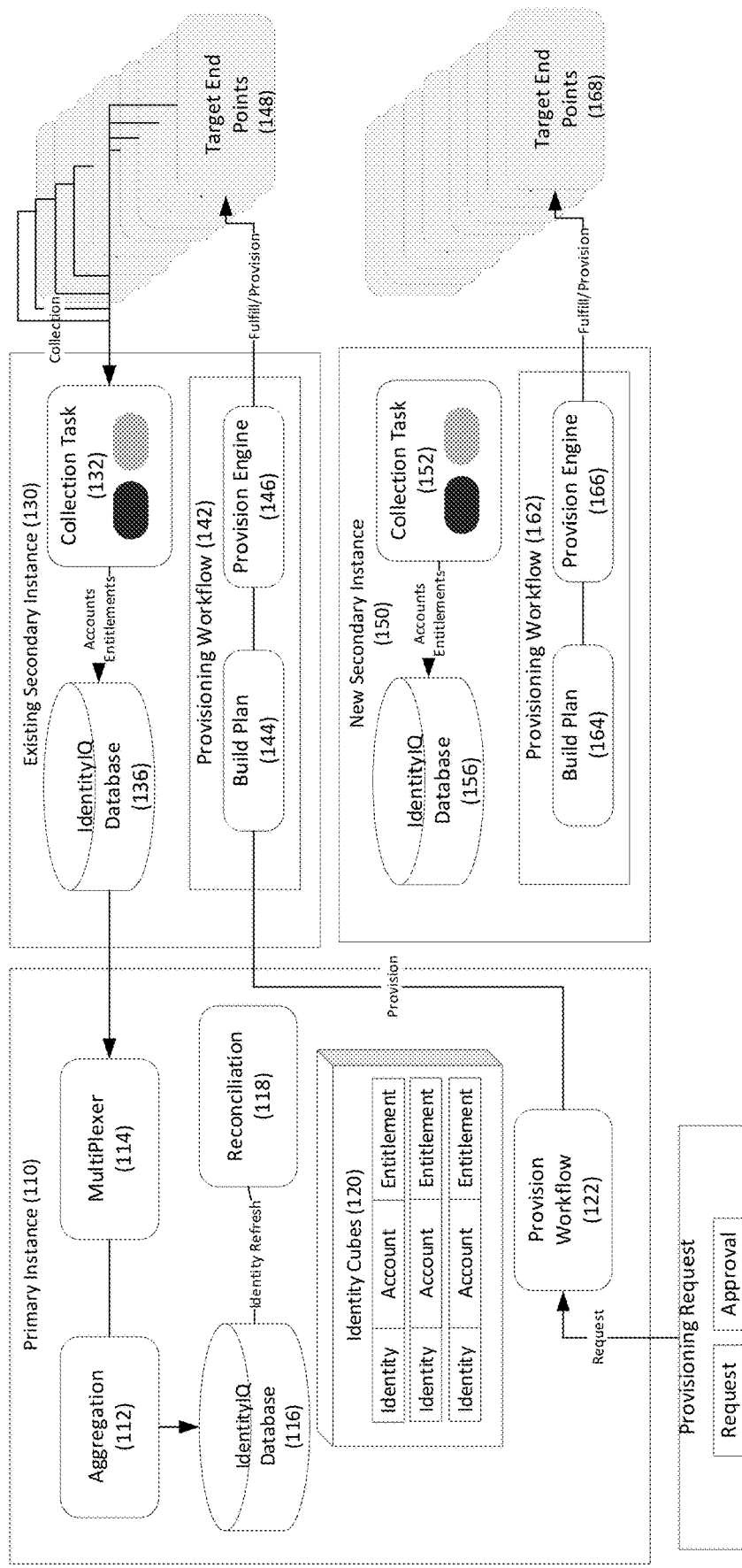
FIG. 1 depicts an exemplary architecture including multiple instances partitioned by application endpoint according to one embodiment.

Systems and methods for provisioning a new secondary IdentityIQ instance to an existing IdentityIQ instance are disclosed. Embodiments may guarantee the scalability of MyAccess key processes, including request (e.g., access requests or access fulfillment), collection (e.g., aggregations that are needed for access reconciliation), and reconciliation (e.g., identity refresh, role propagation, business and IT roles in SailPoint taxonomy; reconciling access catalog policies, business functions, and resource functions with endpoints).

Embodiments may provide the following scalability: (1) process access change requests within a certain amount of time (e.g., within 10 minutes); perform access reconciliation within a certain amount of time (e.g., within 24 hours) for access change requests; and perform access reconciliation within a certain amount of time (e.g., within 24 hours) for access policies.

In embodiments, the services scale regardless of the data shape, even though data shape may impact performance.

Embodiments address scalability issues based on the SailPoint® software's use of identity locks. Identity locks are used by IdentityIQ to avoid collisions on the identity object or any of its sub-objects, including IdentityEntitlements and Link records. There are several "execution contexts" under which IdentityIQ will acquire a lock on an Identity object in context. This is usually the case where IdentityIQ passes an Identity object into a rule for use in site-specific code. The execution contexts where IdentityIQ will achieve a lock include: (1) Account Aggregation execution context—Collection; (2) Identity Refresh execution context—Reconciliation; and (3) LCM Workflow execution context—Request.

A sailpoint.object.Identity object spans multiple relational database tables, including "spt_identity", "spt_identity_assigned_roles", "spt_identity_bundles", "spt_identity_capabilities", "spt_identity_controlled_scopes", "spt_identity_dashboard", "spt_identity_workgroups", and "spt_link". No modification to the sub-objects, like an Identity's workgroup memberships, should be made without locking the identity object first.

Locks on sailpoint.object.Identity objects expire after 300 seconds (5 minutes) by default and will expire if the calling code that acquired the lock fails to release the lock. In embodiments, this parameter may be changed to the minimum allowed of 60 seconds. This helps prevent Identity objects being "locked forever" in the event that an Aggregation or other task experiences a null pointer exception during processing that causes the calling code to not release the lock. The locking mechanism that IdentityIQ provides on the sailpoint.object.Identity object takes the form of a string column on the spt_identity database table row. The spt_identity.iiqlock database column contains the metadata about what piece of code currently has a lock on the Identity object in question, and it contains information about when the lock will expire. If the contents of the spt_identity.iiqlock database column is null or empty then no executing piece of code currently has a lock on the Identity object.

Fat identity cubes may also be a constraint of identity locking which creates I/O contention constraining scalability. Furthermore, the need for identity cubes are driven by use case, profile, and process. For example, for an active directory, links may be limited to 1000 per identity cube. On mainframes, where network latency and aggregation plays a larger factor, the limit may be set to 100 links per identity cube for mainframe connectors. In addition, human and non-human identities may have different link profiles.

Embodiments may decouple the aggregation, reconciliation, and request processes within an instance. For example, by partitioning by an endpoint, the processes may be aligned with each instance, which may decouple the processes from those of other instances. This improved alignment of aggregation, reconciliation and request processes provides near term capacity benefits, identity locking benefits and longer-term product roadmap benefits.

For example, if two different secondary instances are being aggregated on the same identity, the collection from the two instances may be performed in parallel. Similarly, if a request is being processed on one secondary instance, and an aggregation is being performed on another secondary at the same time on the same identity, there are no conflicting locks.

Embodiments may share processes, tables, indexes, and/or data across secondary instances.

Referring to FIG. 1, an exemplary architecture including multiple instances partitioned by application endpoint is provided. For example, the multiple instance environment partitioned by target endpoints partitions the environment into three instances—primary instance 110 and two secondary instances—existing secondary instance 130 and new secondary instance 150, each focused on a specific set of applications. Other numbers of secondary instances may be used as is necessary and/or desired.

In one embodiment, primary instance 110 and secondary instances 130 and 150 may be IdentityIQ instances.

In one embodiment, existing secondary instance 130 may be in existence, and a request to partition it with new secondary instance 150 may be received. This may result in the creation of primary instance 110, and a transition of existing secondary instance 130 to a secondary instance.

For example, existing secondary instance 130 may focus on mainframe target endpoints, and new secondary instance 150 may focus on active directory target endpoints. Other examples may include partitioning by identity (e.g., human target end points, non-human target endpoints), partitioning by business, etc. In one embodiment a hybrid of two or more provisioning strategies may be used as is necessary and/or desired.

In the secondary instances, aggregation tasks 112 may operate in the same manner they do with a single instance, built and configured as part of the onboarding process. In embodiments, a custom task (not shown) may dynamically generate and launch aggregation tasks 112 based on the applications that have been taken out of maintenance mode. Primary endpoint instance 110 may perform the request and reconciliation process 118 and aggregate from the target endpoints.

Secondary instances 130 and 150 may hold the definition or execution of any policies (e.g., SailPoint® software's business roles) that may be executed on primary instance 110. The identity refresh and change propagation processes run on primary instance 110 and may follow standard IdentityIQ patterns.

In embodiments, partitioning may be accomplished by leveraging standard functionality applied to the request and aggregation processes, discussed below.

Primary instance 110 may include multiplexer application 114, such as a Java Database Connectivity (JDBC) multiplexer application. Multiplexer application 114 may read in all of the accounts aggregated by secondary instances 130 and/or 140. For example, multiplexer application 112 may read the accounts for secondary instances 130 and/or 140 from the respective secondary instance's spt_link table.

For example, the SQL statement may include: (1) native identity; (2) display name; (3) application name; (4) connector class; and (5) link attributes. These attributes may also be in the account schema, and the application may be configured to include build map and JDBC provision rules.

In one embodiment, primary instance 110 may include a multiplex build map rule (not shown), which may be responsible for unpacking the attributes field and dynamically extending the application schema to include the attributes contained in that single field. It may also be responsible for setting the IIQSourceApplication attribute based on the application name.

In one embodiment, primary instance 110 may include a JDBC provision rule (not shown) that may be responsible for routing a provisioning request that is received at provision workflow 122 from, for example, a user, a system, etc. The provisioning rule may (1) call existing secondary instance 130 or new secondary instance 150's get application credential workflow (not shown), build an in-memory application for the given endpoint type, instantiate a connector class, and provision directly.

Primary instance 110 may include IdentityIQ database 116 and identity cubes 120. In one embodiment, include IdentityIQ database 116 and identity cubes 120 may be standard SailPoint elements.

For example, for partitioning by identity, when secondary instance (e.g., existing secondary instance 130) collecting from one of target endpoints 148, existing secondary instance 130 needs to understand which identities are valid and which ones are not. Because this is not relative to existing secondary instance 130, the list of identities needs to be managed and kept up to date, while the invalid identities need to be put through the exception process. The list of identities may be maintained, for example, by primary instance 110 using a table or similar.

Existing instance 130 and new endpoint instance 150 may include IdentityIQ databases 136 and 156, respectively. Each may further include collection tasks 132 and 152, respectively, which may collect data from respective target end points 148 and 148. Provisioning workflows 142 and 162 may include build plans 144, 164 and provision engines 146, 166 that may fulfill and provision to respective target endpoints 148, 168, and reconcile the fulfillment and provisioning.

Figure 2:
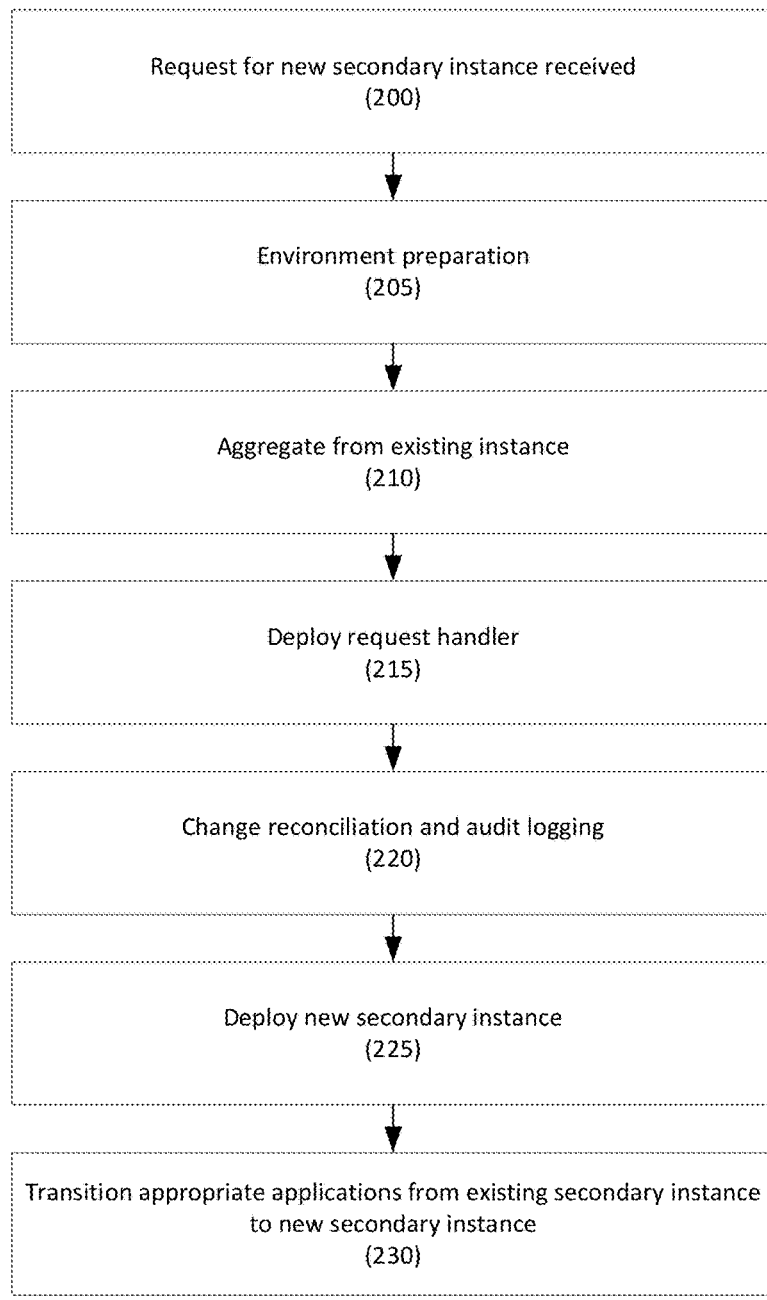
FIG. 2 depicts a method for provisioning a new secondary IdentityIQ instance to an existing IdentityIQ instance according to one embodiment.

Referring to FIG. 2, a method for provisioning a new secondary instance to an existing instance is provided according to one embodiment. In one embodiment, the instances may be IdentityIQ instances.

In step 200, a request for a provisioning a new secondary instance may be received. In one embodiment, the request may be from a user, from a system, from an application, etc. The request may identify the type of target endpoints that the new secondary instance will service, such as mainframe, infrastructure as a service, human, non-human, etc.

In one embodiment, an existing instance may receive the provisioning request. Further, the provisioning request may request that a new secondary instance be provisioned to an existing instance. This results in the creation of a primary instance, and the existing instance becoming a secondary instance.

In another embodiment, the request may be received by a program or application (e.g., the SailPoint® software) executed in the cloud, on one or more servers, combinations thereof, etc.

In step 205, once the request is approved, the environment for the new secondary instance may be prepared by, for example, the program or application. In one embodiment, one or more checks may be made to ensure that the appropriate hardware is ready and available for the additional secondary instance.

In one embodiment, the primary instance may be created.

In step 210, aggregations from the existing instance to the primary instance may be initiated. For example, data from the existing instance's databases (e.g., the existing instance's IdentityIQ database(s)) may be collected and stored in the primary instance's database(s) (e.g., primary instance's IdentityIQ database(s)). Thus, following completion of the aggregation, the primary instance should hold a copy of the data in the existing instance.

In step 215, a request handler may be deployed to the primary instance. In one embodiment, the request handler may change incoming requests from being handled by the existing instance to being handled by the primary instance. This may include all interactions with the access catalog.

In one embodiment, the request handler may identify a new configuration and new workflow that reflects the existence of the new secondary instance and the existing instance also as a secondary instance.

In step 220, the reconciliation and audit process may be changed from the existing instance to the primary instance. In one embodiment, steps 215 and steps 220 may occur substantially simultaneously.

In step 225, a new secondary instance may be deployed. In one embodiment, logic in the primary instance, such as configurations and/or tables, may be added, updated, and/or changed to recognize the target endpoints for the secondary instance. This may be based on the target endpoint types identified in the request.

In step 230, the appropriate applications may be transitioned from the existing secondary instance to the new secondary instance, or they may be deployed to the secondary instance. For example, based on the type of target endpoints, the applications that are appropriate for the new secondary instance's target endpoints may be moved to the new secondary instance.

In one embodiment, the applications may be identified based on the operations to be performed by the secondary instance and/or the secondary instance's target endpoints.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for provisioning an existing IdentityIQ instance with a new secondary IdentityIQ instance, comprising:
   receiving a request to provision the new secondary IdentityIQ instance;
   creating a primary IdentityIQ instance for the existing IdentityIQ instance and the new secondary IdentityIQ instance;
   aggregating data from the existing IdentityIQ instance to the primary IdentityIQ instance;
   deploying an event handler to the primary IdentityIQ instance to handle incoming requests for the existing IdentityIQ instance;
   changing a reconciliation process and an audit process from the existing IdentityIQ instance to the primary IdentityIQ instance thereby changing the existing IdentityIQ instance to the secondary IdentityIQ instance for the primary IdentityIQ instance;
   deploying the new secondary IdentityIQ instance to the primary IdentityIQ instance; and
   deploying at least one application to the new secondary IdentityIQ instance based on an operation processed by the new secondary IdentityIQ instance.

2. The method of claim 1, wherein the request to provision the new secondary IdentityIQ instance is received by the existing IdentityIQ instance.

3. The method of claim 1, wherein the request to provision the new secondary IdentityIQ instance comprises an identification of a target endpoint type for the new secondary IdentityIQ instance.

4. The method of claim 1, wherein the target endpoint type comprises one of a mainframe, infrastructure as a service, a human, and a non-human.

5. The method of claim 1, further comprising:
   verifying that hardware to support the new secondary IdentityIQ instance is available.

6. The method of claim 1, wherein the data aggregated from the existing IdentityIQ instance comprises data from the existing IdentityIQ instance's IdentityIQ database.

7. The method of claim 1, wherein the request handler processes requests with an access catalog.

8. The method of claim 1, wherein the step of deploying the new secondary IdentityIQ instance comprises updating logic the primary IdentityIQ instance is updated to recognize the target endpoints for the new secondary IdentityIQ instance.

9. The method of claim 3, wherein the at least one application that is deployed to the second IdentityIQ instance is associated with the target endpoint type for the new secondary IdentityIQ instance.

10. A system for provisioning an existing instance with a new secondary instance, comprising:
   an existing IdentityIQ instance;
   a primary IdentityIQ instance; and
   a new secondary IdentityIQ instance;
   wherein:
      the primary IdentityIQ instance aggregates data from the existing IdentityIQ instance;

the primary IdentityIQ instance's event handler is updated to handle incoming requests for the existing IdentityIQ instance;

the primary IdentityIQ instances' reconciliation process and audit process are changed from the existing IdentityIQ instance to the primary IdentityIQ instance; and at least one application is deployed to the new secondary IdentityIQ instance based on an operation processed by the new secondary IdentityIQ instance.

11. The system of claim 10, wherein the request to provision the new secondary IdentityIQ instance is received by the existing IdentityIQ instance.

12. The system of claim 10, wherein the request to provision the new secondary IdentityIQ instance comprises an identification of a target endpoint type for the new secondary IdentityIQ instance.

13. The system of claim 10, wherein the target endpoint type comprises one of a mainframe, infrastructure as a service, a human, and a non-human.

14. The system of claim 10, further comprising a host program or application that verifies that hardware to support the new secondary IdentityIQ instance is available.

15. The system of claim 10, wherein the data aggregated from the existing IdentityIQ instance comprises data from the existing IdentityIQ instance's IdentityIQ database.

16. The system of claim 10, wherein the request handler processes requests with an access catalog.

17. The system of claim 10, wherein logic in the primary IdentityIQ instance is updated to recognize the target endpoints for the new secondary IdentityIQ instance.

18. The system of claim 12, wherein the at least one application that is deployed to the second IdentityIQ instance is associated with the target endpoint type for the new secondary IdentityIQ instance.

* * * * *